March 10, 1936.  H. R. HIGLEY  2,033,634
OPHTHALMIC INSTRUMENT
Filed July 7, 1934  2 Sheets-Sheet 1

INVENTOR
HENRY R. HIGLEY
BY
ATTORNEY

March 10, 1936.                H. R. HIGLEY                2,033,634
                            OPHTHALMIC INSTRUMENT
                            Filed July 7, 1934            2 Sheets-Sheet 2
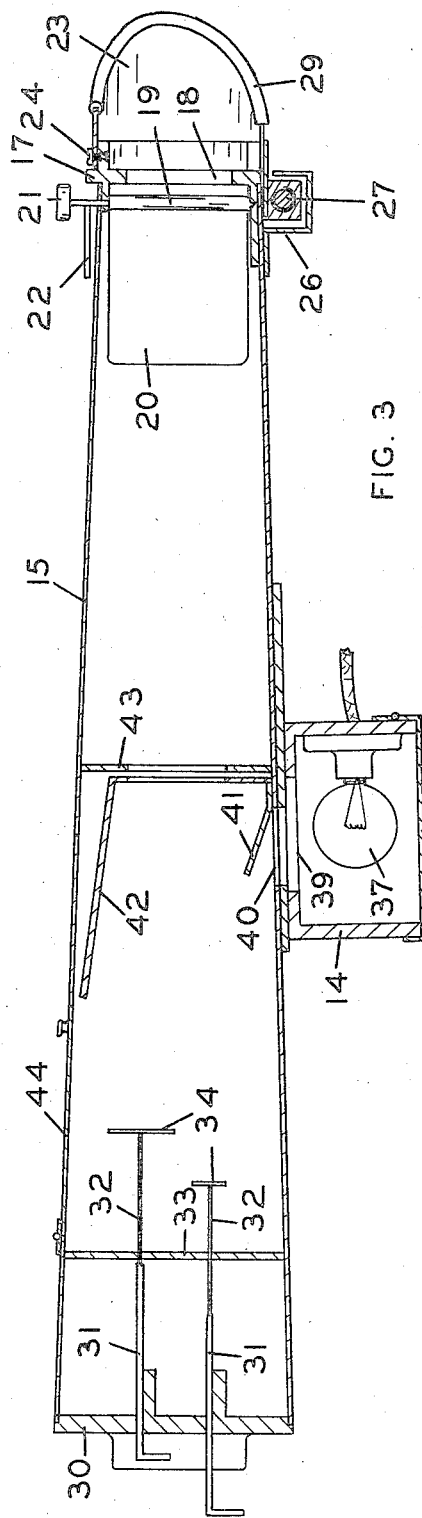
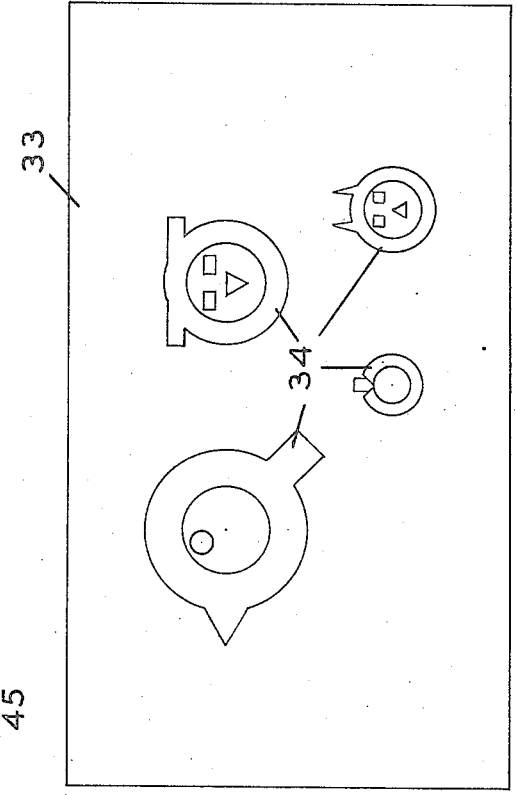
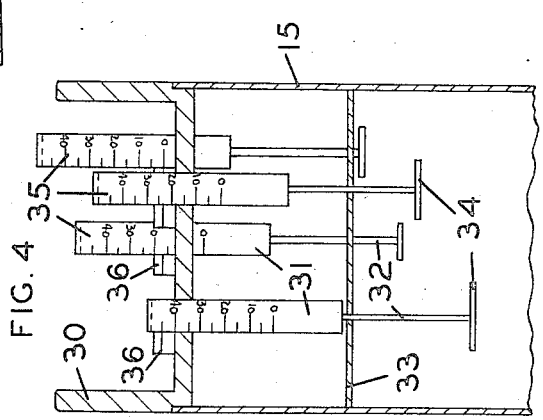
INVENTOR
HENRY R. HIGLEY
BY
ATTORNEY Patented Mar. 10, 1936

2,033,634

UNITED STATES PATENT OFFICE 2,033,634

OPHTHALMIC INSTRUMENT

Henry R. Higley, Pittsfield, Mass.

Application July 7, 1934, Serial No. 734,146

5 Claims. (Cl. 88—20)

This invention relates to ophthalmic instruments and more particularly it has reference to devices which may be used for detecting binocular depth perception and determining the parallactic angle.

One of the objects of my invention is to provide an improved instrument for detecting and making measurements relative to the perception of depth. Another object is to provide an instrument of the character described which will be relatively simple in structure yet efficient and convenient in operation. Further objects are to provide, in an instrument of the type described, improved eye shield, target illumination and septum means. These and other objects and advantages reside in certain novel features of construction, arrangement and combination of parts as will hereinafter be more fully described and pointed out in the appended claims.

Referring to the drawings:

Fig. 3 is a vertical sectional view of the instrument.

Fig. 4 is a fragmentary horizontal sectional view showing the targets and associated scale means.

Fig. 5 is a view showing the face view of the targets.

Figure 1:
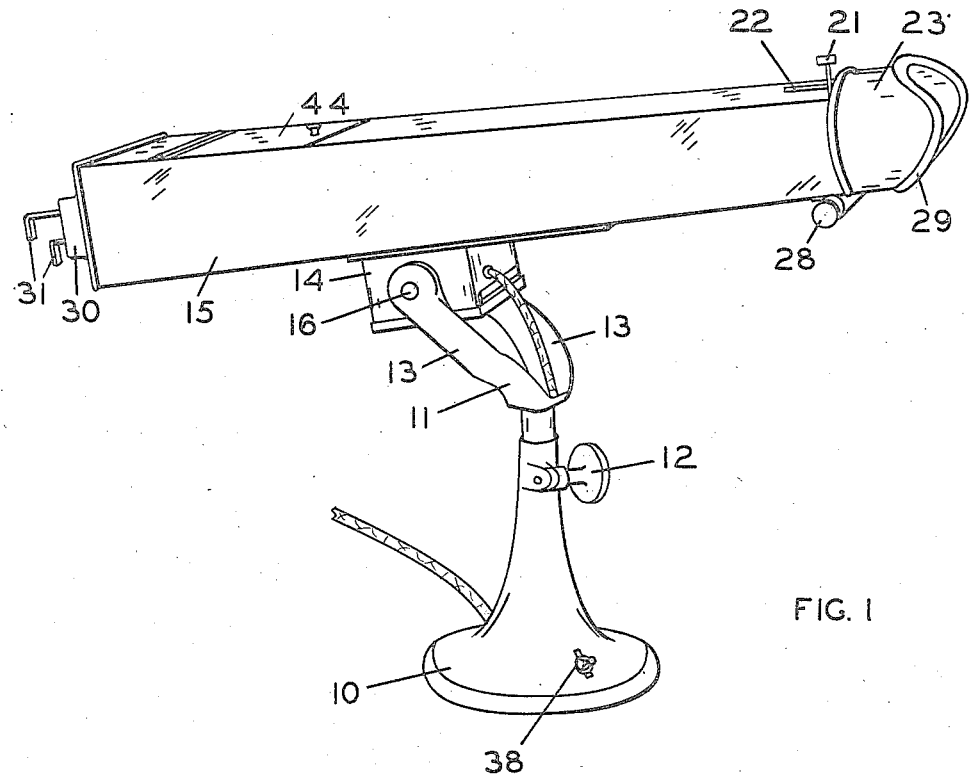
Fig. 1 is a perspective view of the instrument embodying my invention.
Figure 2:
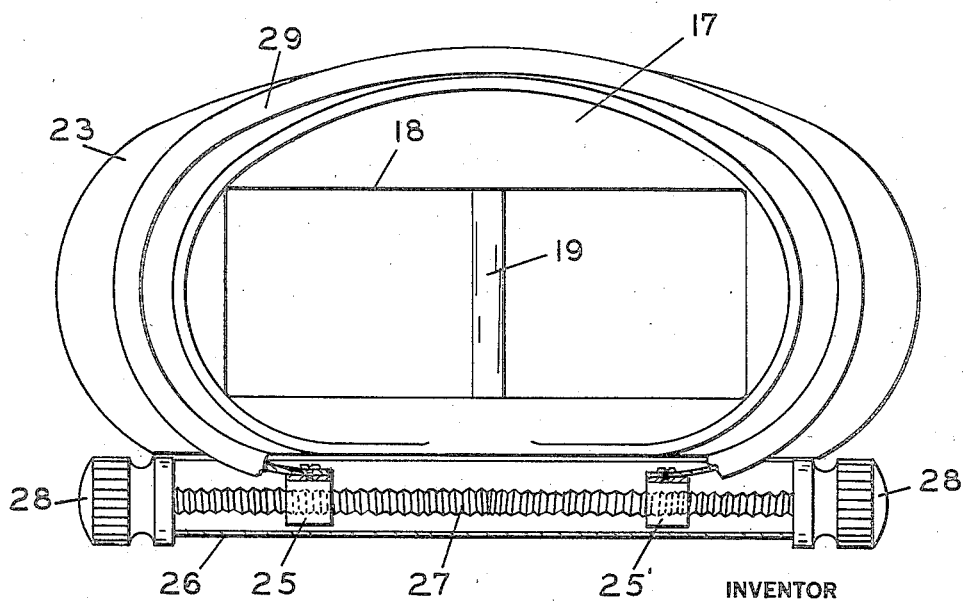
Fig. 2 is an enlarged view of the adjustable eye shield.

A preferred embodiment of my invention is illustrated in the drawings wherein 10 indicates a base on which is slidably and rotatably mounted a bracket 11 which may be locked in adjusted position by means of the screw 12. The bracket 11 has a pair of spaced bearing members 13 between which is mounted the housing 14 carrying the elongated casing 15. The housing 14 is pivotally mounted at 16 so that the instrument may be tilted about a horizontal axis to suit the convenience of the patient.

The casing 15 carries at one end thereof a casting 17 having a sight opening 18 before which the eyes of a patient may be positioned. Pivotally mounted on the casting 17 is the vertical rod 19 carrying a septum 20. The rod 19 projects outside of the casing and carries knob 21 so that the septum 20 may be selectively turned to a middle position, shown in Fig. 3, so that the vision of both eyes is unobstructed or to a lateral position to cover either eye. A pointer 22 attached to rod 19 indicates to the examiner the position of the septum. In order to prevent stray light from entering the instrument around the patient's head and eyes there is provided an eye shield member 23 which is secured, at its medial portion, to casting 17 by a screw 24 and has two free ends secured, respectively, to the nuts 25 and 25'. Rotatably mounted within a casing 26 is a screw 27 having right and left hand threaded portions cooperating with the nuts 25 and 25' so that rotation of the screw 27 by either knurled knob 28 will cause the two free ends of the eye shield to be moved, simultaneously, to or from each other and thereby effect an adjustment of the eye shield. The edge of the eye shield is preferably covered with a rubber cushion 29.

The other end of casing 15 carries a casting 30 having openings in which are slidably mounted the four strips 31 each terminating in a rod 32 extending through the back plate 33. On the ends of the rods 32 there are carried the targets 34 which may be of different sizes and shapes as shown in Fig. 5. The targets 34 are black and white, with the outer portions of the targets white so they are clearly visible against the black background of plate 33. The strips 31 are provided with scale means 35 adapted to cooperate with index plates 36. In order to afford illumination for the targets 34 there is placed in housing 14 an incandescent lamp 37 adapted to be controlled by a switch 38 mounted in base 10. The housing 14 has an opening 39 in registration with opening 40 in casing 15 so that light rays from lamp 37 strike the plates 41 and 42 which are coated with a flat white lacquer and so act as diffusing reflectors. The inside of casing 15 is provided with a dull black finish. A diaphragm plate 43 positioned within the casing serves to define the field of vision. The casing 15 is provided with a hinged door 44 affording access to the interior of the casing and housing 14 also is provided with a hinged door 45.

In using my instrument, the patient is placed with his head against the eye shield 23 and directed to gaze at the illuminated targets 34 and inform the examiner which target or targets are closer to the patient, the targets having previously been moved, by the examiner, into different positions along their respective longitudinal axes. The ability of the patient to detect the longitudinal separation of two of the targets is a measure of the patient's binocular depth deception. The longitudinal separation of two targets in millimeters may be determined from the scales 35, and, knowing the distance from the patient's eyes to each target, the patient's interpupillary distance and the transverse distance between the targets, the patient's binocular parallactic angle may be computed.

In order to demonstate binocular stereoscopic vision to a patient, the examiner, with the lamp extinguished, may turn septum 20 so as to obstruct the vision of one eye of the patient. Under this situation, the patient will be unable to accurately judge the relative positions of the various targets which have been moved to different locations by the examiner. With the septum in a medial or neutral position, however, both eyes have unobstructed vision and the differences in target separations may be perceived.

Such and other tests and measurements are of importance in making examinations of the eyes, especially of aviators, auto drivers and others who depend upon the ability to judge distances accurately. These tests make it possible to classify individuals according to their ability to discriminate and judge distance so that their employment or occupation may be regulated accordingly. Various modifications can obviously be made without departing from the spirit of my invention.

I claim:

1. An instrument of the character described comprising a casing having at one end thereof a sight opening before which the eyes of an observer may be placed, a plurality of targets independently movably mounted adjacent the other end of the casing for movement to and from the sight opening, and a septum movably mounted adjacent to said opening whereby said targets may be selectively viewed by either or both eyes of the observer.

2. An instrument of the character described comprising a casing having a sight opening at one end thereof, a plurality of laterally spaced targets independently slidably mounted within said casing at the other end thereof for movement toward and from said sight opening and scale means exteriorly of said casing for indicating the position of each of said targets.

3. An instrument for detecting depth perception comprising an elongated casing having a sight opening at one end thereof, two or more targets independently movably mounted at the other end of the casing for movement toward and from said sight opening, an opening in the wall of the casing between the targets and the sight opening, a light source adjacent said opening and diffusing and reflecting means for directing light rays from said source onto said targets.

4. An instrument for detecting depth perception comprising a casing having a sight opening at one end thereof, a plurality of targets independently movably mounted adjacent the other end of the casing for movement toward and from said sight opening and means for providing diffusely reflected light rays for illuminating said targets.

5. An instrument for detecting depth perception comprising a base having a pair of spaced bearing members, a housing pivotally mounted between said members, an elongated casing secured to said housing, one end of said casing having a sight opening, a plurality of targets mounted at the other end of the casing, a light source within said housing, said housing and casing having aligned openings and reflecting means in said casing for directing light rays onto said targets.

HENRY R. HIGLEY.